United States Patent [19]
Gall et al.

[11] 4,115,386
[45] Sep. 19, 1978

[54] PERYLENE-3,4,9,10-TETRACARBOXYLIC ACID DIIMIDE PIGMENT, ITS MANUFACTURE AND ITS USE

[75] Inventors: Ludwig Gall, Frankenthal; Wolfgang Fabian, Wilhelmsfeld, both of Fed. Rep. of Germany

[73] Assignee: BASF Aktiengesellschaft, Ludwigshafen, Fed. Rep. of Germany

[21] Appl. No.: 725,394

[22] Filed: Sep. 22, 1976

[30] Foreign Application Priority Data
Oct. 11, 1975 [DE] Fed. Rep. of Germany ....... 2545701

[51] Int. Cl.² .............. D06P 1/649; C07D 471/06
[52] U.S. Cl. ............................ 260/281 P; 8/1 R
[58] Field of Search ........................... 260/281 P

[56] References Cited

U.S. PATENT DOCUMENTS

| | | | |
|---|---|---|---|
| 2,905,685 | 9/1959 | Eckert et al. | 260/281 |
| 2,905,686 | 9/1959 | Eckert et al. | 260/281 |
| 3,006,882 | 10/1961 | Altermatt | 260/281 |
| 3,022,299 | 2/1962 | Schmidt et al. | 260/281 |
| 3,772,303 | 11/1973 | Spietschka et al. | 260/282 |
| 3,974,136 | 8/1976 | Hunger et al. | 106/288 Q |

FOREIGN PATENT DOCUMENTS

| | | | |
|---|---|---|---|
| 1,113,773 | 9/1961 | Fed. Rep. of Germany | 260/281 |
| 1,202,302 | 8/1970 | United Kingdom | 260/281 |

*Primary Examiner*—Donald G. Daus
*Assistant Examiner*—Mark L. Berch
*Attorney, Agent, or Firm*—Keil, Thompson & Shurtleff

[57] ABSTRACT

A new pigmentary form of perylene-3,4,9,10-tetracarboxylic acid diimide of the formula

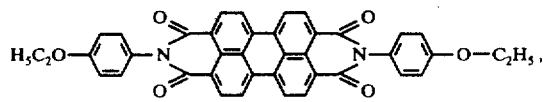

which has a specific surface area (measured by the BET method) of from 10 to 35 m²/g and a maximum in the particle size distribution at from 0.1 to 0.5 μm, the proportion of particles between these sizes being at least 50% of the total distribution and the mean ratio of length to width being from 3:1 to 1:1. The pure shade of the new pigmentary form gives strongly yellowish red colorations which are very pure and very bright. The new pigmentary form also has a good hiding power, which is from 2 to 3 times as great as that of the pigmentary forms of the prior art.

2 Claims, No Drawings

PERYLENE-3,4,9,10-TETRACARBOXYLIC ACID DIIMIDE PIGMENT, ITS MANUFACTURE AND ITS USE

German Pat. No. 1,113,773 discloses the manufacture of a pigmentary form of perylene-3,4,9,10-tetracarboxylic acid diimide of the formula

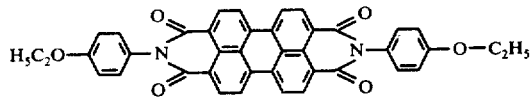

The pigmentary form obtained in accordance with the disclosure in the said patent specification gives transparent colorations. It can be used — above all, in conjunction with white pigments — for coloring surface coatings, and for mass coloring plastics, especially plasticized PVC. Because of the pigment being blended with a white pigment, the colorations obtained are dull and pale.

It is an object of the present invention to find a pigmentary form of the said colorant — which has a tinctorially interesting hue only in transparent colorations — which, as a full shade, gives colorations of good hiding power which at the same time have a bright and pure hue.

We have found that this object is achieved by a perylene-3,4,9,10-tetracarboxylic acid diimide pigment, having good hiding power, of the formula (I)

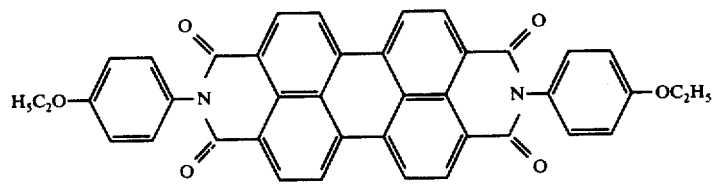

which has a specific surface area (measured by the BET method) of from 10 to 35 m²/g, preferably from 20 to 30 m²/g, and a maximum in the particle size distribution at from 0.1 and 0.5 /μm, preferably from 0.2 to 0.5 /μm, the proportion of particles between these sizes being at least 50%, preferably from 70 to 90%, of the total distribution, and the mean ratio of length to width of the particles being from 3:1 to 1:1, preferably from 2:1 to 1:1.

The new pigmentary form as a pure shade gives strongly yellowish red colorations, having a fine and very bright hue, which are clearer and brighter than those obtained with the conventional pigmentary forms of the same chemical compound. At the same time the new pigmentary form is distinguished by good hiding power, which is from about two to three times that of the pigmentary forms of the prior art.

The new tinctorial properties of the new pigmentary form may also be seen from the reflectance curve in the visible region of the spectrum, from 350 to 750 nm, which is employed in the literature for characterizing pigments (cf., for example, Pigment Handbook, Volume III, Characterization and physical relationships, John Wiley & Sons, New York, 1973, pages 255-270)

The new pigmentary form exhibits complete absorption at from 350 to 560 nm, followed by a sharp rise in the reflectance up to the reflection maximum at 655 nm. From the reflection maximum to the end of the visible region, at 750 nm, 60% of the incident light are reflected by colorations which contain the new pigmentary form.

In contrast, the conventional pigmentary forms of the same chemical compound, which consist of smaller or larger primary particles, also show no reflectance up to 560 nm, but from this region onward there is a slow rise to the reflection maximum. The reflection of a thick pigment layer, i.e. of a layer under which the base is no longer visible, is from 40 to 50% of the incident light for pigmentary forms of the prior art; this means that the reflectance of the new pigmentary forms in the wavelength range from 655 nm to 750 nm is from 20 to 50% higher.

The opaque pure shade colorations obtained with the new pigmentary forms cannot be obtained by mixing a transparent red pigment with a white pigment. It is true that white pigments can be used to prepare mixtures which have a reflectance of 60% or more at 650 nm. However, such mixtures additionally show partial reflectance in the region from 400 to 500 nm and a sharp rise in the reflectance at from 680 to 750 nm, which shifts the hue of the mixture toward blue. Tinctorially, this blue shift has the adverse effect of manifesting itself as dulling.

The new pigmentary form of the invention furthermore has better fastness to weathering than the conventional pigmentary forms of the same chemical compound. This advantage manifests itself particularly in the case of light hues. Thus, for example, a metallic baking finish, prepared using 1 part by weight of the new pigmentary form and 9 parts by weight of aluminum powder, shows virtually no change in hue after 60 days' accelerated weathering in accordance with DIN 53,387 (rating, according to DIN 54,001 : 4-5). In contrast, the fastness to weathering of a metallic finish, containing a pigmentary form of the prior art, of the same chemical compound, is only rated at 2-3; this pigmentary form was obtained by grinding perylenetetracarboxylic acid bis-p-phenetidide in the presence of sodium chloride.

Similar remarks apply to blends with white pigments, e.g. with titanium dioxide.

The new pigmentary form is obtained by recrystallizing crude perylene-3,4,9,10-tetracarboxylic acid is bis-(p-ethoxyphenylimide), in which the primary particles have a size of from 0.05 to 0.1 /μm and form agglomerates of from 0.1 to 100 /μm, in organic fluids, in the presence or absence of water, at from 80° to 200° C, until the particle size is from 0.1 to 0.5 /μm, preferably from 0.2 to 0.5 /μm, and the mean ratio of length to width of the particles is from 3:1 to 1:1, preferably from 2:1 to 1:1.

The starting material is obtained from the crude product, resulting from the manufacturing process, by milling, for example in ball mills, in the absence of milling assistants, until the milled material essentially consists of primary particles of from 0.05 to 0.1 /μm. "Essentially"

for the purposes of the present invention means that at least 60 to 70% of the particles are within the stated size range. The milling time is from 8 to 30 hours depending on the nature and size of the crystals of the crude product. Since the milling partially destroys the crystalline structure of the particles, the comminuted particles formed carry high surface charges. For this reason agglomerates of size from 0.1 to 100 /μm are formed from the primary particles in the milled material.

The milled material is recrystallized by introducing it into the organic fluid and heating the mixture at from 80 to 200° C, preferably from 90° to 120° C, whereupon the finely divided crude pigment recrystallizes. The recrystallization is terminated when at least 50% of the particles have a length of from 0.1 to 0.5 /μm, preferably from 0.2 to 0.5 /μm, and the specific surface area of the pigment particles is from 10 to 35 m²/g, preferably from 20 to 30 m²/g (measured by the BET method). Depending on the organic fluid used, and on the temperature, from 7 to 30 hours are required for the recrystallization.

Examples of organic fluids which may be used for the crystallization process are aliphatic ketones of 3 to 6 carbon atoms, e.g. acetone, methyl ethyl ketone, diethyl ketone, methyl propyl ketone and methyl isobutyl ketone, ethylene glycol monoalkyl ethers or diethylene glycol monoalkyl ethers, where alkyl is of 1 to 4 carbon atoms, e.g. the monomethyl, monoethyl, monopropyl and/or monobutyl ethers of ethylene glycol and of diethylene glycol, ethers, e.g. dioxane and tetrahydrofuran, alcohols, e.g. propanol, n-butanol and iso-butanol, aromatic hydrocarbons, e.g. xylene, toluene and chlorobenzene, and also dimethylformamide, o- and p-nitrophenol, and mixtures of these fluids. Recrystallization media which are preferred above all are propanol, iso-butanol, methyl ethyl ketone, dioxane, xylene, o-nitrophenol and mixtures of these, since they can easily be removed quantitatively and reused. The use of these fluids mixed with water is particularly preferred, since this gives tinctorially particularly valuable pigmentary forms. In this case, the recrystallization is preferably carried out at the boiling point of the aqueous mixture.

The recrystallization mixture is then worked up by conventional methods, e.g. by diluting with water, and filtering off the pigment. The solvent can also be distilled off as an azeotrope with water, after which the pigment can be isolated from the aqueous suspension, e.g. by filtering or centrifuging. The water-moist press cake can then be further processed as obtained, or can be dried.

The pigment can also be isolated from an aqueous, preferably organic, phase by freeze drying. For this purpose, the recrystallization is advantageously carried out in an organic fluid which solidifies at from 0° to 60° C. If this is not the case, the organic fluid used for the recrystallization must be removed and be replaced by an organic fluid suitable for freeze drying, e.g. xylene, benzene or dioxane.

The Examples which follow illustrate the invention. Percentages are by weight.

EXAMPLE a. 400 g of perylene-3,4,9,10-tetracarboxylic acid bis-p-phenetidide are milled for about 20 hours in a stainless steel ball mill (volume: 4 l) filled with 5 kg of iron balls of from 2 to 2.5 cm diameter. After this treatment, the milled material consists essentially of primary particles of size from 0.05 to 0.1 /μm. The primary particles are agglomerated. The size of the agglomerates is from 0.1 to 100 /μm.

50 g of the milled material, 65 g of methyl ethyl ketone and 100 g of water are stirred at 80° C under autogenous pressure until the size of the primary particles is from 0.1 to 0.5 /μm. This is the case after 15 hours. The mixture is then let down through a reflux condenser and the methyl ethyl ketone is distilled off as an azeotrope. The pigment is filtered off, dried and pulverized. Its BET surface area is 28 m²/g (BET surface area = surface area determined by the method of St. Brunauer, P. H. Emmet and E. Teller, J. Amer. Chem. Soc. 60 (1938), 309).

A virtually equivalent pigment is obtained if the methyl ethyl ketone is replaced by the same amount by weight of isobutanol and the mixture is heated under reflux for 15 hours at the boil or, in the case of o-nitrophenol, at from 80 to 90° C.

b. The pigment obtained according to (a) was tested colorimetrically.

(α) Production of a full shade coloration.

4.5 g of pigment and 10.5 g of Grinding Base 100 S (manufacturer: Lawter Chemicals Inc., Chicago) are weighed into a porcelain dish on an analytical balance, mixed with a spatula and ground on a triple roll mill, at constant temperature (25° C), first three times under a roll contact pressure of 10 atmospheres and then six times under a roll contact pressure of 80 atmospheres (color paste A).

2 g of the above color paste (pigment content 30.0 per cent by weight) are mixed homogeneously with 4 g of a mixture consisting of 70 g of Rokraplast SF 501 ®(manufacturer: Robert Kraemer), 30 g of Alkyldal S 47 ®(manufacturer: Bayer) and 100 g of Cymel 301 ®(manufacturer: Cyanamid) and 6 drops of a 20% strength solution of p-toluenesulfonic acid in n-butanol, on a glass plate, by means of a spatula. A 100 /μm thick layer of the pigment paste thus obtained is spread over a black-and-white base by means of a film spreader. This coating is air-dried for 2 hours at room temperature and is then baked for 45 minutes at 120° C.

The resulting coloration was evaluated by the FIAF programme, in accordance with DIN 6,164. The colorimetric date are summarized in the Table.

(β) Coloration in PVC, for determining the hiding power.

3 g of the color paste obtained as described in (b) (α) and 47 g of a mixture consisting of 68 g of suspension PVC, 25 g of di-3,5,5-trimethylhexyl phthalate, 6 g of octylstearate as an extender and 1 g of a stabilizer are mixed for 60 seconds by means of a high speed stirrer at 3,000 revolutions per minute and the mixture is left to stand for one hour at room temperature and then freed from air bubbles, which has been stirred into it, for one hour in a desiccator under reduced pressure.

300 /μm thick films of the PVC color paste thus prepared and deaerated are applied to glass strips by means of a coating knife. These coatings, set up accurately horizontal, are gelled for 20 minutes at 180° C in a drying oven.

After they have cooled, areas of size 5 × 5 cm (= 25 cm²) are marked out in the films by means of a stencil, lifted off the glass plate and then weighed.

To determine the hiding power, the films thus obtained are measured spectrophotometrically over a black-and-white contrast base. From the spectral reflectance values over black and white, the pigment concentration per unit area at which the contrast would fall to the threshold value of 1 AN unit, according to DIN 6,174, was calculated, using the Kubelka-Munk theory.

The result is shown in the Table.

For comparison, pigmentary forms, of the prior art, of the same chemical compound were tested in accordance with the same method.

Pigment A = the milled material used for recrystallization.

Pigment B = product obtained by milling the crude product, resulting from the synthesis, with sodium chloride, dissolving out the salt with water, and filtering and drying the pigment.

Pigment C = untreated crude product as obtained from the synthesis.

Pigment D = pigment finished as described in Example 5 of the process disclosed in German Laid-Open Application DOS 2,013,672.

Pigment E = a commercial pigment obtainable under the tradename ®INDOFAST-BRILLIANT-RED R 6370.

TABLE

| Pigment | Hue T | Saturation S | L | Reflectance at 655 nm % | Hiding Power (m²/kg) | Particle size (μm) |
|---|---|---|---|---|---|---|
| According to the invention | 7.54 | 6.00 | 2.997 | 61 | 107 | 0.2–0.5 |
| A | 8.54 | 4.79 | 4.409 | 18 | <30 | 0.05–0.1+ |
| B | 8.41 | 3.63 | 4.603 | 15 | <30 | 0.01–0.04 |
| C | 7.76 | 4.75 | 3.836 | 41 | low | 1–100 |
| D | 7.78 | 4.56 | 3.857 | 26 | <70 | 0.02–0.05 |
| E | 7.58 | 5.55 | 3.243 | 50 | <70 | 0.5–1.0 |

+ greatly agglomerated

Literature:
1. Objektive coloristische Farbstoff- und Pigmentprufung mittels EDV, L. Gall in Farbe und Lack 75 (1969), 854-862.
2. Color in business, science and industry, Judd and G. Wyszecki, John Wiley & Sons, New York.
3. Farbenlehre und Farbenmessung, W. Schultze, Springer Verlag, Berlin-Heidelberg-New York, 2nd, amended and enlarged edition, 1966.

We claim:

1. A particulate perylene-3,4,9,10-tetracarboxylic acid diimide pigment of the formula

which has a specific surface area (measured by the BET method) of from 10 to 35 m²/g and particle length distribution range in which a maximum value is reached at from about 0.1 to 0.5 μm, the proportion of particles between these limits being at least about 50% of the total distribution, and the mean ratio of length to width of the particles is from about 3:1 to 1:1.

2. A perylenetetracarboxylic acid diimide pigment as claimed in claim 1, wherein the mean ratio of length to width of the pigment particles is from 2:1 to 1:1.